Dec. 28, 1943.  G. E. PRICE  2,337,836
IRON
Filed Aug. 17, 1940

WITNESSES:

INVENTOR
George E. Price.
BY
ATTORNEY

Patented Dec. 28, 1943

2,337,836

UNITED STATES PATENT OFFICE 2,337,836

IRON

George E. Price, Mansfield, Ohio, assignor to Westinghouse Electric & Manufacturing Company, East Pittsburgh, Pa., a corporation of Pennsylvania Application August 17, 1940, Serial No. 353,023

1 Claim. (Cl. 219—25)

My invention relates to sadirons and more particularly to the thermostatic control of such devices.

The thermal responsive elements of the thermostats used in selectively controlling the operating temperatures of portable irons, now known to the art, are positioned within the sole plate of such iron so as to be responsive to the temperature thereof. In addition to this, such thermostats well known to the art have numerous ingenious methods for anticipating or approximating the temperature of the exterior or ironing surface of the sole plate so that an operator may selectively determine the ironing temperature of the iron structure. All these well known and established methods of determining and maintaining a selected temperature of the ironing surface have been approximations and in no cases known to the art has there been a successful method of having the thermal responsive element of the thermostat actually responsive to temperature of the exterior surface of the sole plate or to the temperature of the material being ironed. This type of control is considered the ideal which all the heretofore ingenious structures have been attempting to approximate.

In contrast with the ingenious structures now known to the art for only approximating the temperature of the exterior or working surface of the sadiron, I have found and perfected a simple, positive acting thermostatic structure for an iron, the thermal responsive element of which is located within or is a part of the working surface of the iron so as to be responsive to the actual temperature of such surface as well as the temperature of the material being ironed.

It is therefore an object of my invention to provide a thermostatic structure for a sadiron having a thermal responsive element therefor positioned within the working surface of the iron so as to be responsive to the temperature thereof and to the temperature of the material being ironed.

A further object of my invention is to provide a thermostatic control for a sadiron which will selectively maintain the temperature of the ironing surface thereof so as to maintain a desired temperature of the material being ironed.

Still a further object of my invention is to provide a smoothing iron having an adjustable thermostat for maintaining a desired temperature at the ironing surface thereof.

Another object of my invention is to provide a sadiron structure having a hydraulic thermostatic control, the bulb of which is placed within the sole plate with at least a part of such bulb in the plane of the smoothing or ironing surface of the sole plate.

Other objects of my invention will either be pointed out specifically in the course of the following description of a device embodying my invention, or will be apparent from such description.

Figure 1:
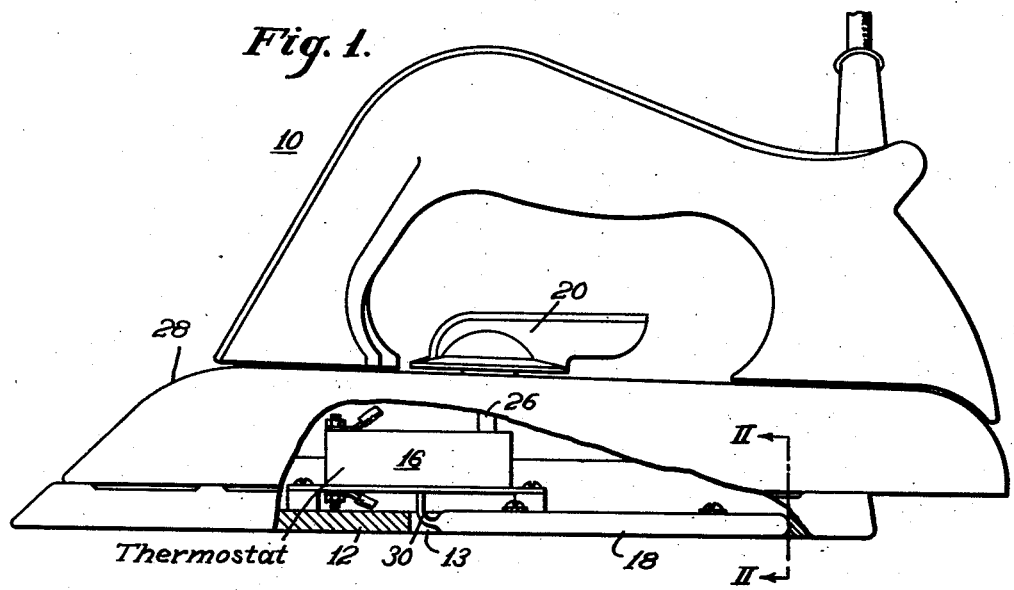
Figure 1 is a partial elevational and sectional view of a sadiron embodying my invention.

Referring to the accompanying drawing, in which like reference characters indicate like parts in the several figures, I show an iron 10 comprising a sole plate 12, a heating element 14 positioned therein for supplying heat thereto, and a thermostatic structure 16 associated therewith for maintaining a predetermined selective temperature of such sole plate, said thermostatic structure having a thermal responsive element 18 positioned within the sole plate 12 and operatively associated with the thermostat to operate it, and an adjusting knob 20 for selectively determining the temperature at which the thermostat will operate.

The iron structure 10 illustrated in the accompanying drawing may be of any desired configuration or arrangement. However, the sole plate 12 thereof has a relatively thin central portion and a suitable slot or aperture 13 or its equivalent preferably within this central portion to permit a thermal responsive element 18 to be positioned therein, as hereinafter more fully described.

Figure 2:
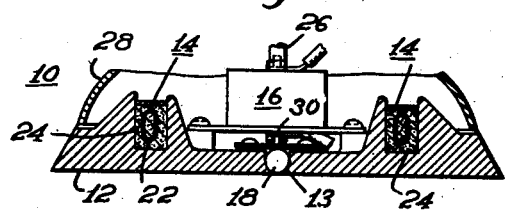
Fig. 2 is a sectional view taken along the line II—II of Fig. 1.

The heating element 14 illustrated in Fig. 2 is positioned within a preformed slot within the inner face of sole plate 12 and comprises a resistor 22 insulated from the sole plate 12 by means of a suitable compacted insulating material 24. This heating element is more clearly described and claimed in a copending application, Serial No. 234,628, filed October 12, 1938 and assigned to the assignee of this invention. However, it is to be understood that any other suitable heating element may be used in lieu thereof.

The thermostatic structure 16 illustrated in Fig. 1 is of a familiar type and comprises any suitable arrangement or mechanism which will be responsive to the actions of the thermal responsive element 18 and which is capable of selectively energizing and deenergizing the heating element 14, in a well known manner. The thermostatic structure 16 has an upstanding adjusting shaft 26 which passes through the upper cover plate 28 of the iron structure 10 for retaining the adjusting knob 20 upon the upper end thereof. The adjusting knob 20 thus, through the action of the adjusting shaft 26, is adapted to selectively determine the temperature at which the thermostat 16 will operate to energize and deenergize the heating element 14, in a well known manner.

The thermal responsive element 18 is, in this instance, an elongated bulb-type element having a fluid, such as chlorinated diphenyl, for example, therein which will preferably expand uniformly over the entire temperature range of the sole plate for operating the thermostat 16. The bulb-like element 18 is connected to the thermostatic structure 16 by means of any suitable capillary tube 30, or the like, as is customary, so that minute variations in pressure within the thermal responsive bulb 18 will be transmitted to the thermostatic structure 16 so as to operate such structure, in a well known manner (not shown) in response to the changes in temperature in the sole plate 12 or in the material which is being ironed, as hereinafter described.

It will be noted in Fig. 2 that the bulb-like thermal responsive element 18 has at least a part thereof within or forming a part of the lower or operating surface of the sole plate 12. It will be further noted that a portion of the bulb 18 is thus exposed as a part of such ironing surface, and it is to be understood that, such exposed portion of the bulb 18 may be flattened to increase the area thereof, which is in the plane of the ironing surface. It therefore follows that the bulb 18 is responsive to the temperature of the ironing surface of the sole plate 12, which surrounds it, and also to the temperature of the material which is being ironed or to the material which the bulb 18 rests against while the iron is being used in a normal manner. Accordingly, it follows that the bulb 18 being associated with the thermostat 16 through capillary tube 30 operates the thermostat 16 in response to the changes in temperature of the material being ironed as well as the temperature of the surface of the sole plate 12.

It is therefore obvious that the structure embodying my invention provides an iron having a sole plate with a working surface thereon, a heating element in thermal communication therewith and a variable or selectively adjustable thermostat for maintaining a desired temperature of the sole plate by means of a thermal responsive element exposed within the working surface of the sole plate so as to be responsive to the temperature thereof, as well as to the temperature of material being ironed.

Various modifications may be made in the device embodying my invention without departing from the spirit and scope thereof, and I desire, therefore, that only such limitations shall be placed thereon as are imposed by the prior art and the appended claim.

I claim as my invention:

In a smoothing device for ironing cloth-like material having a sole plate with an ironing surface thereon, a heating element for heating such sole plate and ironing surface and an adjustable thermostat for controlling the energization of the heating element, the combination of an expansion bulb associated with the thermostat to control the operation thereof, said bulb being stationarily positioned in the sole plate with at least a part thereof being in the plane of the ironing surface so as to actuate the thermostat in response to the temperature of the material being smoothed and to ensure the maintenance of the material being ironed at the predetermined selective temperature.

GEORGE E. PRICE.